United States Patent [19]

Abe

[11] Patent Number: 5,151,933
[45] Date of Patent: Sep. 29, 1992

[54] KEY TELEPHONE SYSTEM

[75] Inventor: Kazuyuki Abe, Yokohama, Japan

[73] Assignee: Nitsuko Corporation, Kawasaki, Japan

[21] Appl. No.: 744,503

[22] Filed: Aug. 14, 1991

[30] Foreign Application Priority Data

Aug. 16, 1990 [JP] Japan .................................. 2-216758

[51] Int. Cl.⁵ ................................ H04M 1/272
[52] U.S. Cl. .................... 379/159; 379/209; 379/355
[58] Field of Search ............ 379/156, 157, 159, 209, 379/355, 356

[56] References Cited

U.S. PATENT DOCUMENTS 5,054,058 10/1991 Kakizawa ........................ 379/157

Primary Examiner—Stafford D. Schreyer
Attorney, Agent, or Firm—Fleit, Jacobson, Cohn, Price, Holman & Stern

[57] ABSTRACT

A key telephone system with a re-dialing feature has a memory with two memory areas. One of the two memory areas is provided for an outside-line call, and the other is provided for an internal-line call to a particular extension. Each memory area memorizes a dialed number therein and replaces a number of the last intended call, previously present in the memory area, with the most recently dialed number. A re-dialing push-button automatically retrieves the number of a last intended outside-line call, memorized in the outside-line memory area, when actuated following a selection of an outside-line call, or the number of a last intended inside-line call to a particular extension, memorized in the extension memory area, when actuated following a selection of an internal-line call to a particular extension.

3 Claims, 2 Drawing Sheets

KEY TELEPHONE SYSTEM

BACKGROUND OF THE INVENTION

1. Field of the Invention

The present invention relates to a telephone system and, more particularly, a key telephone system which automatically dispatches a dial signal representative of a most recently dialed telephone number to re-dial the most recently placed call.

2. Description of Related Art

Typically, push-button or key telephone systems have a re-dialing feature. When a re-dial push-button or key is pushed after a push-button or key has been pushed to provide access to an outside-line, a dial signal is automatically dispatched to the outside line to a location having the most recently dialed telephone number.

Such a push-button or key telephone system conventionally memorizes, in its internal memory, the telephone number dialed for the last call only. The automatic re-dialing feature is, therefore, unavailable for an outside-line call if an inside-line call to another extension is made after the most recently placed outside-line call, since, in this situation, the telephone number memorized by the push-button or key telephone system is the dialed number of the most recently intended extension call.

SUMMARY OF THE INVENTION

It is a primary object of the present invention to provide a key telephone system with a re-dialing feature which automatically dispatches a dial signal for either the most recently attempted extension call or the most recently attempted outside line call.

The above object of the present invention is accomplished by providing a key telephone system having control means, such as a central processing unit (CPU), for controlling the key telephone system in order to place a call to a telephone number dialed through number entry keys or push-buttons, and a memory which has two separate telephone number memory areas for memorizing first and second dialed numbers used to place an outside-line call and an inside-line call to a particular extension, respectively. The memory, if an outside-line call is to be placed, memorizes a dialed telephone number, used to place the outside-line call through the control means, in the outside-line call memory area so as to replace a telephone number previously memorized therein with the telephone number of the most recently dialed outside-line call. In the same way, the memory, if an inside-line call to a particular extension is to be placed, memorizes a dialed telephone number, used to place the inside-line call to the particular extension through the control means, in the extension call memory area so as to replace a telephone number previously memorized therein with the telephone number of the most recently dialed inside-line call to a particular extension. The key telephone system further comprises line selecting means for selecting appropriate lines for placing outside-line calls and inside-line calls to a particular extension. The line selecting means causes the control means, if an outside-line call is selected, to route an intended call to an outside-line, and selects the appropriate memory area for an outside-line call to memorize a dialed number of the intended call in the selected memory area. Conversely, if an inside-line call to a particular extension is selected, the line selecting means causes the control means to route the intended call to the particular extension and selects the appropriate memory area for an inside-line call to a particular extension t memorize a dialed number of the intended call in the selected memory area. When the most recently dialed call must be redialed, re-dialing means, such as a re-dialing push-button or key, is operated after the line selecting means for causing the control means to retrieve the telephone number memorized in the memory area selected by the line selecting means. The operation of the re-dialing means causes the control means to automatically dispatch an access signal of the last call.

In a particular embodiment of the present invention, the line selecting means comprises push-buttons separately provided for an outside-line call and an inside-line call to a particular extension call, respectively.

The key telephone system according to the present invention has separate memory areas assigned to an outside-line call and inside-line call, respectively. The separate memory areas are selectively used to memorize dialed numbers according to the intended call line selected, which may be either an outside-line call or an inside-line call to a particular extension, for redialing a telephone number of the most recently intended call. This provides easy, one-touch re-dialing of the most recent call made on either an outside-line or an inside-line.

BRIEF DESCRIPTION OF THE DRAWINGS

The specific manner in which the object mentioned above and other objects are accomplished, and various other features of the present invention, will be apparent to those skilled in the art from the description of a preferred embodiment of the invention when considered in conjunction with the accompanying drawings, in which.

DESCRIPTION OF THE PREFERRED EMBODIMENT

Figure 1:
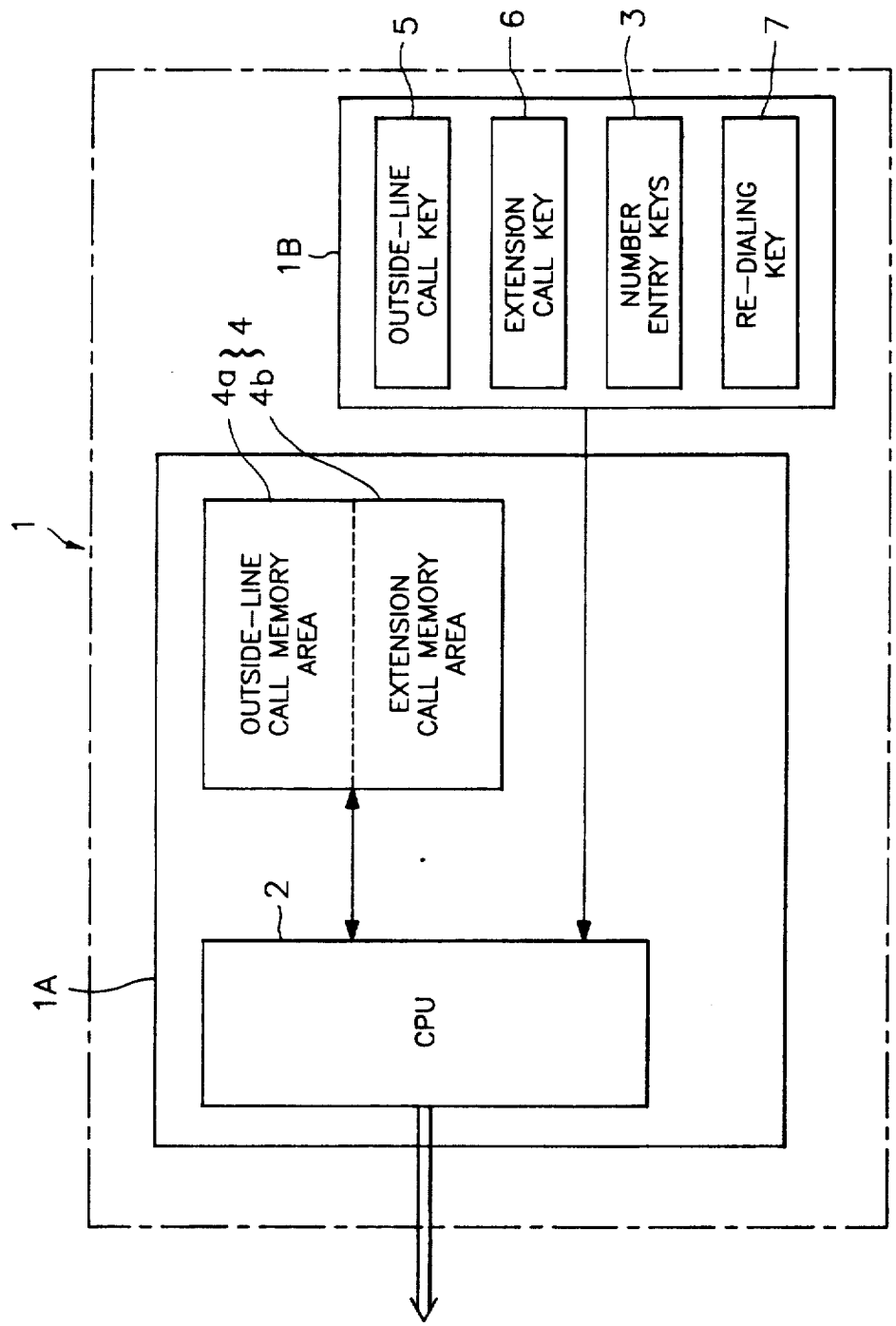
FIG. 1 is a schematic diagrammatic view of a key telephone system in accordance with a preferred embodiment of the present invention.

Referring to the drawings in detail, and particularly to FIG. 1, a key telephone 1 in accordance with a preferred embodiment of the present invention is shown, in block diagram, as comprising a main equipment section 1A and an extension terminal 1B. The main equipment section IA has a central processing unit (CPU) 2, which includes a general purpose microcomputer, and an internal memory 4. The internal memory 4 has two separate memory areas, namely, an outside-line call memory area 4a for memorizing a dialed number for an outside-line call and an extension call memory area 4b for memorizing a dialed number of an internal-line call to a particular extension.

The extension terminal 1B includes various push-buttons or keys, such as number entry keys 3, an outside-line call function key (outside-line call key) 5, an extension call function key (extension call key) 6 and a re-dialing function key (re-dialing key) 7. When number entry keys 3 are used to dial or enter a telephone number in order to place either an internal call to another extension or an external call to an outside line, a signal representative of the dialed number is dispatched to a trunk line through the central processing unit (CPU) 2. Data representative of the dialed number, which generally is in the form of a series of digits, is memorized either in the outside-line call memory area 4a or in the extension call memory area 4b, depending on whether the call being made is to an outside-line or to an inside-line extension. Every time the dialed number is memorized in either the memory area 4a or the memory area 4b, a dialed number previously memorized in the same memory area 4a or 4b is replaced with the most recently dialed number.

When the outside-line call function key 5 is pushed or otherwise operated, indicating that an outside-line call is to be placed, the central processing unit (CPU) 2 provides an access signal in order to gain access to an outside-line and simultaneously selects the outside-line memory area 4a. Thereafter, when the number entry keys 3 are pushed or operated to enter a telephone number for an outside-line call, the central processing unit (CPU) 2 routes the outside-line call to a location having the dialed telephone number and simultaneously transmits a dial signal representative of the dialed number to the outside-line memory area 4a to replace a previously memorized dial signal stored in the outside-line memory area 4a with the data or signal representative of the dialed number of the most recent outside-line call, whether the outside-line is busy or not.

On the other hand, when the extension call function key 7 is pushed or otherwise operated, indicating that a call to an inside-line extension is to be placed, the central processing unit (CPU) 2 provides an access signal in order to gain access to an inside-line and simultaneously selects the extension memory area 4b. Thereafter, when the number entry keys 3 are pushed or operated to enter a telephone number for an inside-line call to a particular extension, the central processing unit (CPU) 2 routes the extension call to a location having the dialed telephone number and simultaneously transmits a dial signal representative of the dialed number to the extension call memory area 4b to replace a previously memorized dial signal stored in the extension call memory area 4b with the signals or data representative of the dialed number of the most recent internal-line call, whether the internal-line extension is busy or not.

For re-dialing the telephone number of the most recently intended call, the re-dialing function key 7 is pushed or operated before the outside-line call function key 5 or the extension call function key 6. Either the outside-line call function key 5 is then operated for routing the redialed call to an outside-line or the extension call function key 6 is operated for routing the redialed call to an extension-line. When the outside-line call function key 5 is operated, the central processing unit (CPU) 2 selects the outside-line call memory area 4a so as to prepare to retrieve the data or signals representative of the telephone number dialed for the last outside-line call from the outside-line memory area 4a and provides an access signal to gain access to an outside-line. Thereafter, the central processing unit (CPU) 2 actually retrieves the data or signals representative of the telephone number of the last outside-line call from the outside-line memory area 4a so as to automatically place the call to the location having the last called number on the outside-line. On the other hand, when the extension call function key 5 is operated, the central processing unit (CPU) 2 selects the extension call memory area 4b so as to prepare to retrieve the data or signals representative of the telephone number dialed for the last inside-line call to a particular extension from the extension memory area 4b and provides an access signal to gain access to an inside-line. Thereafter, the central processing unit (CPU) 2 actually retrieves the data or signals representative of the telephone number of the last extension call from the extension memory area 4b so as to automatically place the call to the extension having the last called number on the inside-line.

Figure 2:
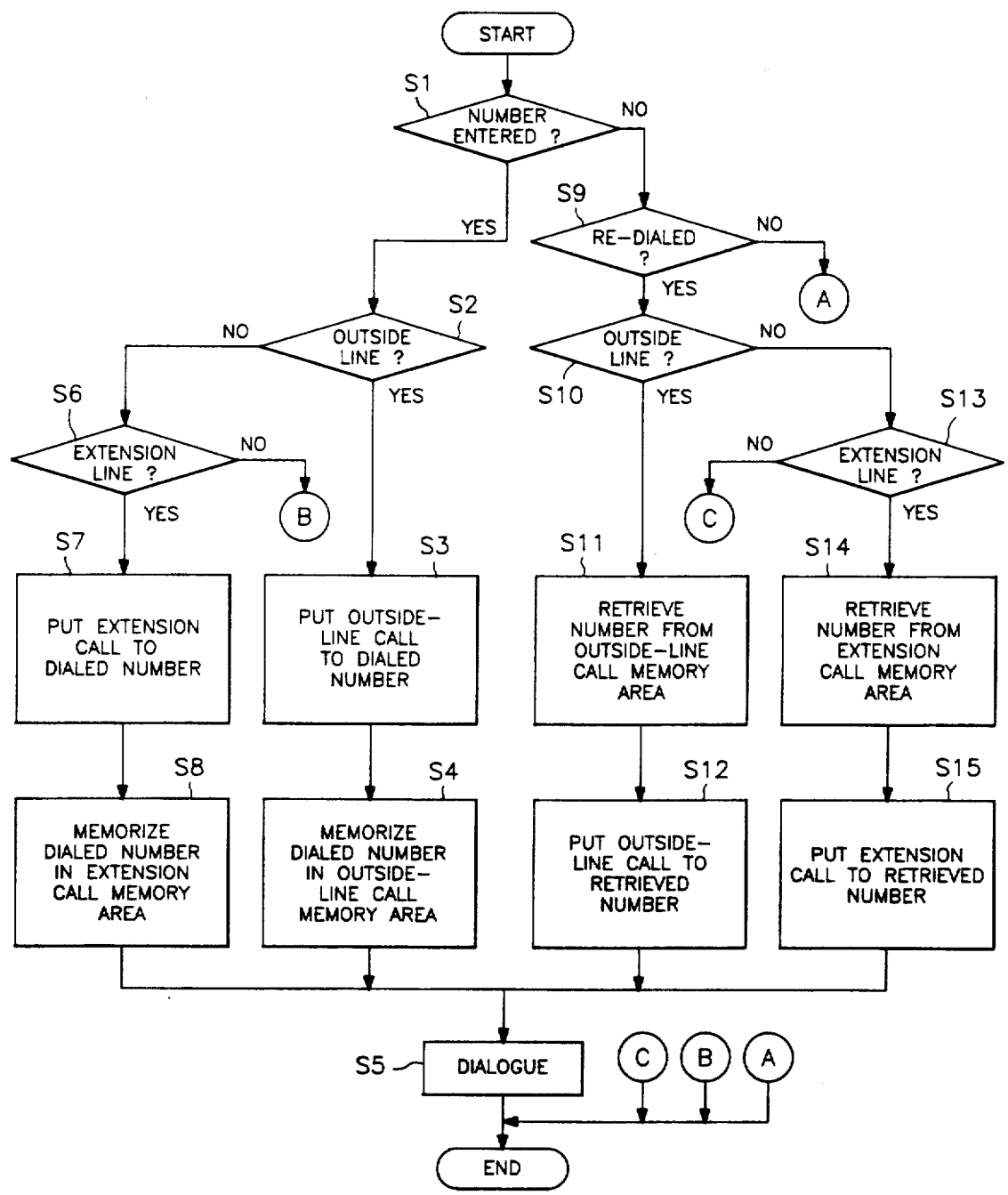
FIG. 2 is a flow chart illustrating a general routine for a microcomputer which controls operation of the key telephone system of FIG. 1.

The operation of the key telephone system depicted in FIG. 1 is best understood by reviewing FIG. 2, which is a flow chart illustrating various routines for the microcomputer of the central processing unit 2. Programming a computer or microcomputer is a skill well understood in the art. The following description is written to enable a programmer having ordinary skill in the art to prepare an appropriate program for the microcomputer. The particular details of any such program would, of course, depend upon the architecture of the particular microcomputer selected. In placing a telephone call, a first decision is made at step S1 as to whether a telephone number is being entered through the number entry keys 3. If the answer to the decision made at step S1 is yes, this indicates that the telephone number is actually being entered. Then, a decision is made at step S2 as to whether the telephone call is intended for an outside-line, based upon whether the outside-line call function key (outside-line key) 5 is pushed or operated. If the answer to the decision made at step S2 is yes, a outside-line call is placed to the dialed telephone number at step S3. A yes answer to the decision made at step S2 also leads to selection of the outside-line call memory area 4a of the internal memory 4 to cause the area 4a to memorize the dialed telephone number and replace a telephone number of the previously placed telephone call stored therein at step S4. After completion of a dialogue on the outside-line at step S5, a final step orders the proceeding or program to end. If the answer to the decision regarding the outside-line call made at step S2 is no, another decision is made at step S6 as to whether the telephone call is intended to be placed to an inside-line extension, namely, whether the extension call function key (extension key) 6 is pushed or operated. If the answer to the decision made in step S6 is yes, an extension call is placed to the extension having the dialed telephone number at step S7. A yes answer to the decision made at step S6 also causes the central processing unit (CPU) 2 to select the extension call memory area 4b of the internal memory 4 to cause the area 4b to memorize the dialed telephone number and replace a telephone number for the previously placed telephone call at step S8. After completion of a dialogue on the internal-line extension at step S5, the final step orders the proceeding or program to end. If the answer to the decision at step S6 is no, this indicates that the redialed telephone call is suspended or interrupted. Consequently, the proceeding or program goes directly to the final step and ends.

If the answer to the decision regarding the entry of a telephone number made at step S1 is no, a decision is made at step S9 as to whether automatic re-dialing is required, based on whether the re-dialing key 7 is pushed or operated. If the answer to the decision made at step S9 is yes, this indicates that the telephone call is actually directed to either the last inside-line extension call or the last outside-line call. Then, a decision is made at step S10 as to whether the re-dialed call is intended to be for an outside-line, based on whether the outside-line call function key (outside-line call key) 5 is pushed or operated. If the answer to the decision made in step S10 is yes, the telephone number of the outside-line call previously placed and memorized in the outside-line call memory area 4a of the internal memory 4 is retrieved at step S11 and is dispatched for re-dialing to place an outside-line call to the re-dialed telephone number at step S12. After completion of a dialogue on the outside-line at step S5, the final step orders the proceeding or program to end.

If the answer to the decision regarding the outside-line call made at step S10 is no, another decision is made at step S13 as to whether the telephone call is intended to be placed over an inside-line to an extension, based on whether the extension call function key (extension call key) 6 is pushed or operated. If the answer to the decision made in step S13 is yes, the telephone number of the extension call previously placed and memorized in the extension call memory area 4b of the internal memory 4 is retrieved at step S14 and is dispatched for re-dialing to place an extension call to the re-dialed telephone number at step S15. After completion of a dialogue on the outside-line at step S5, the final step orders the proceeding to end. Otherwise, if the answer to the decision regarding re-dialed extension call at step S13 is no, this indicates that the re-dialed telephone call is suspended or interrupted. Consequently, the proceeding or program goes directly to the final step and ends.

It is to be understood that although the present invention has been described with respect to a specific embodiment thereof, various other embodiments and variants are possible which fall within the scope and spirit of the invention, and such other embodiments and variants are intended to be covered by the following claims.

What is claimed is:

1. A key telephone system with a re-dialing feature, which has number entry push-buttons for dialing a telephone number of an intended call, comprising:

control means for controlling said key telephone system so as to place a call to a location having a number dialed through said number entry push-buttons;

a memory, having two separate telephone number memory areas for memorizing both a first dialed number for placing an intended outside-line call and a second dialed number for placing a call to an intended extension through said control means so as to replace dialed numbers for placing previous calls, memorized in said memory areas, with said first and second dialed numbers;

line selecting means for selecting one or an outside-line and an inside-line, and causing said control means to gain access to the outside-line to place said intended outside-line call and select said memory area for memorizing said first dialed number when an outside-line is selected, and causing said control means to gain access to the inside-line to place said call to said intended extension and select said memory area for memorizing said second dialed number when an inside-line is selected; and re-dialing means for causing said control means to automatically retrieve one of said first and second dialed numbers memorized in one of said memory areas for a line selected by said line selecting means so as to place the intended call over said line selected by said line selecting means to said number dialed through said number entry push-buttons, thereby automatically re-dialing one of the first and second numbers.

2. A key telephone system as recited in claim 1, wherein said line selecting means comprises push-buttons separately provided for an outside-line call and an inside-line call, respectively.

3. A key telephone system as recited in claim 1, wherein said control means comprises a central processing unit including a general purpose microcomputer.

* * * * *